(12) United States Patent
Schafer (10) Patent No.: US 11,305,975 B2
(45) Date of Patent: Apr. 19, 2022

(54) DUAL LASER CLOSURE SCAN AND METHOD OF USING THE SAME

(71) Applicant: Silgan White Cap LLC, Downers Grove, IL (US)

(72) Inventor: Thomas C. Schafer, Des Plaines, IL (US)

(73) Assignee: Silgan White Cap LLC, Downers Grove, IL (US)

( * ) Notice: Subject to any disclaimer, the term of this patent is extended or adjusted under 35 U.S.C. 154(b) by 352 days.

(21) Appl. No.: 16/225,812

(22) Filed: Dec. 19, 2018

(65) Prior Publication Data

US 2020/0198953 A1 Jun. 25, 2020

(51) Int. Cl.
| | |
|---|---|
| *B67B 3/00* | (2006.01) |
| *B67B 3/26* | (2006.01) |
| *G01N 21/90* | (2006.01) |
| *B65G 43/08* | (2006.01) |
| *B65G 15/50* | (2006.01) |
| *B07C 5/34* | (2006.01) |

(52) U.S. Cl.
CPC ............ *B67B 3/265* (2013.01); *B07C 5/3408* (2013.01); *B65G 15/50* (2013.01); *B65G 43/08* (2013.01); *G01N 21/90* (2013.01)

(58) Field of Classification Search
CPC ... B67B 3/26; G01N 21/9036; G01N 21/9054
USPC ........................................... 356/239.4, 240.1
See application file for complete search history.

(56) References Cited

U.S. PATENT DOCUMENTS

| | | | | |
|---|---|---|---|---|
| 2,982,862 | A | * | 5/1961 | Smith ....................... B67B 3/26 |
| | | | | 250/223 B |
| 3,469,689 | A | * | 9/1969 | O'Neill .................... B07C 5/128 |
| | | | | 209/529 |
| 6,049,379 | A | * | 4/2000 | Lucas ................. G01N 21/9036 |
| | | | | 250/223 B |
| 6,473,170 | B2 | * | 10/2002 | Schafer ..................... B07C 5/10 |
| | | | | 250/223 B |
| 6,654,117 | B1 | * | 11/2003 | Reading .................... B67B 3/26 |
| | | | | 356/240.1 |
| 9,557,275 | B2 | * | 1/2017 | Niedermeier .......... G01N 21/90 |
| 9,569,833 | B2 | * | 2/2017 | Heuft ...................... B67B 3/261 |
| 2002/0097396 | A1 | * | 7/2002 | Schafer ................ G01N 21/909 |
| | | | | 356/240.1 |

(Continued)

OTHER PUBLICATIONS

Keyence, "CMOS Multi-Function Analog Laser Sensor, IL Series," Catalog, appears to be published 2010, 12 pages.

(Continued)

*Primary Examiner* — Eyamindae C Jallow
(74) *Attorney, Agent, or Firm* — Reinhart Boerner Van Deuren s.c.

(57) ABSTRACT

A system of measuring a top surface of a closure to determine if the closure is properly affixed to a container. Multiple paths of measurements may be collected and analyzed. In various analysis paradigms, measurements on a given path are separated into different sets, such as a leading set that generally includes the first third of measurements, a trailing set that includes the trailing set of measurements, and a middle set that includes the middle third of measurements. Several methods of analysis may be based on a presumption that a properly affixed closure is symmetrical or near symmetrical.

13 Claims, 9 Drawing Sheets

(56) References Cited

U.S. PATENT DOCUMENTS

2013/0271755 A1* 10/2013 Lindner ................ G01N 21/90
356/240.1
2013/0278927 A1* 10/2013 Johnson ................ B67B 1/00
356/240.1

OTHER PUBLICATIONS

Sick, "TriSpector1000, Intuitive 3D Inspection," Catalog, appears to be published Nov. 1, 2015, 20 pages.
Information from manufacturer Keyence showing possible applications for laser devices, 2 pages.
Thomas C. Schaefer, photos provided by inventor of laser sensor, 1 page.

* cited by examiner

DUAL LASER CLOSURE SCAN AND METHOD OF USING THE SAME

BACKGROUND OF THE INVENTION

The present disclosure relates generally to the field of closures. The present disclosure relates specifically to monitoring closures on bottles to confirm they are affixed tightly and correctly to containers.

SUMMARY OF THE INVENTION

Described herein are systems and methods to determine whether closures are properly affixed to containers. In one or more embodiments the system uses multiple lasers to measure distances. The containers are moved, via a conveyer, under a laser platform and measurements of distances to the top of the closure are collected and analyzed. Based on analysis of the measurements, the system determines whether the closure is properly affixed to the container.

In one embodiment, the system comprises a conveyer for containers, such as bottles, and multiple distance measuring devices, such as lasers that include laser detectors. The conveyer moves the containers in a first direction past the lasers. The top surface of the closure is measured by the lasers along multiple paths, one path per detection device. In the situation in which the lasers are stationary, the detection paths on the closure are straight lines, but it is contemplated herein that the lasers may be adjustable.

Each path can be divided into multiple sets of measurements that are distinct from each other. For example, a path may include a leading set of measurements, which includes measurements that are generally centered around the front-third of the corresponding path, a middle set of measurements, which includes measurements that are generally centered on the corresponding path, and a trailing set of measurements, which includes measurements that are generally centered around the rear-third of the corresponding path.

The sets of measurements are analyzed to determine whether the closure is properly affixed to its container. One method of analysis averages one or more sets, and if each averaged set is below a threshold the closure is properly affixed. Another method of analysis averages two or more sets and subtracts the highest average from the lowest average. If the difference is less than a threshold, then the closure is properly affixed. Another method of analysis calculates a difference between the middle set and the average of one or both of the leading and trailing sets. If the difference or differences are less than a threshold, then the closure is properly affixed. Another method of analysis confirms that the leading and trailing sets have opposite slopes of near equal magnitudes. For example, if the leading set has an upward slope measurement of 8 (eight), then the trailing set should have a downward slope measurement at or near −8 (negative eight), assuming the closure to be properly affixed.

Another method of analysis involves summing differences between subsequent measurements, starting at the outer part of the closure moving inward, for one or more of the sets. The sums for multiple sets are compared to each other. Because a properly affixed closure is typically, although not necessarily, symmetrical, the sum for each set should be equal or nearly equal.

Various other methods of analysis consider pairs of measurements. For example, given an exemplary path that includes 40 measurements, one method pairs up the measurements (e.g., measurements 1 and 40, 2 and 39, 3 and 38, etc.). The differences between some (e.g., 5 pairs, 10 pairs) or all the pairs is calculated, and the differences are summed together. If the sum is below a threshold the closure is properly affixed. One or more of these methods involves summing differences from different paths and comparing that sum to the threshold.

In one or more embodiments the processor and other devices in the system generate signals that are representative of the measurements and calculations being performed. It is contemplated herein that the signals may be transmitted between devices (e.g., from the first laser to the processor) or they may be internal to a device (e.g., from the processor via one calculation to the processor for a second calculation).

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplar

BRIEF DESCRIPTION OF THE DRAWINGS

This application may be more fully understood from the following detailed description, taken in conjunction with the accompanying figures, wherein like reference numerals refer to like elements in which.

DETAILED DESCRIPTION

Many automated systems apply closures to containers via automated means. However, closures are not always properly affixed to the containers. To avoid spills and problems, it is useful to quickly identify which closures are not properly affixed to their respective containers.

In one embodiment, a system includes a conveyer belt, a laser platform and a discarding mechanism. When the system determines that a closure is not properly affixed the discarding mechanism redirects the offending closure and container to be separately addressed. The laser platform includes two or more lasers that measure distances to different paths on the top surface of the closures. The distances measured are analyzed to determine the status of closure (e.g., whether the closure is properly affixed to the container). Several different analysis methodologies can be used, many of which utilize two separate measurements of distances to a top surface of the closure.

Figure 1:
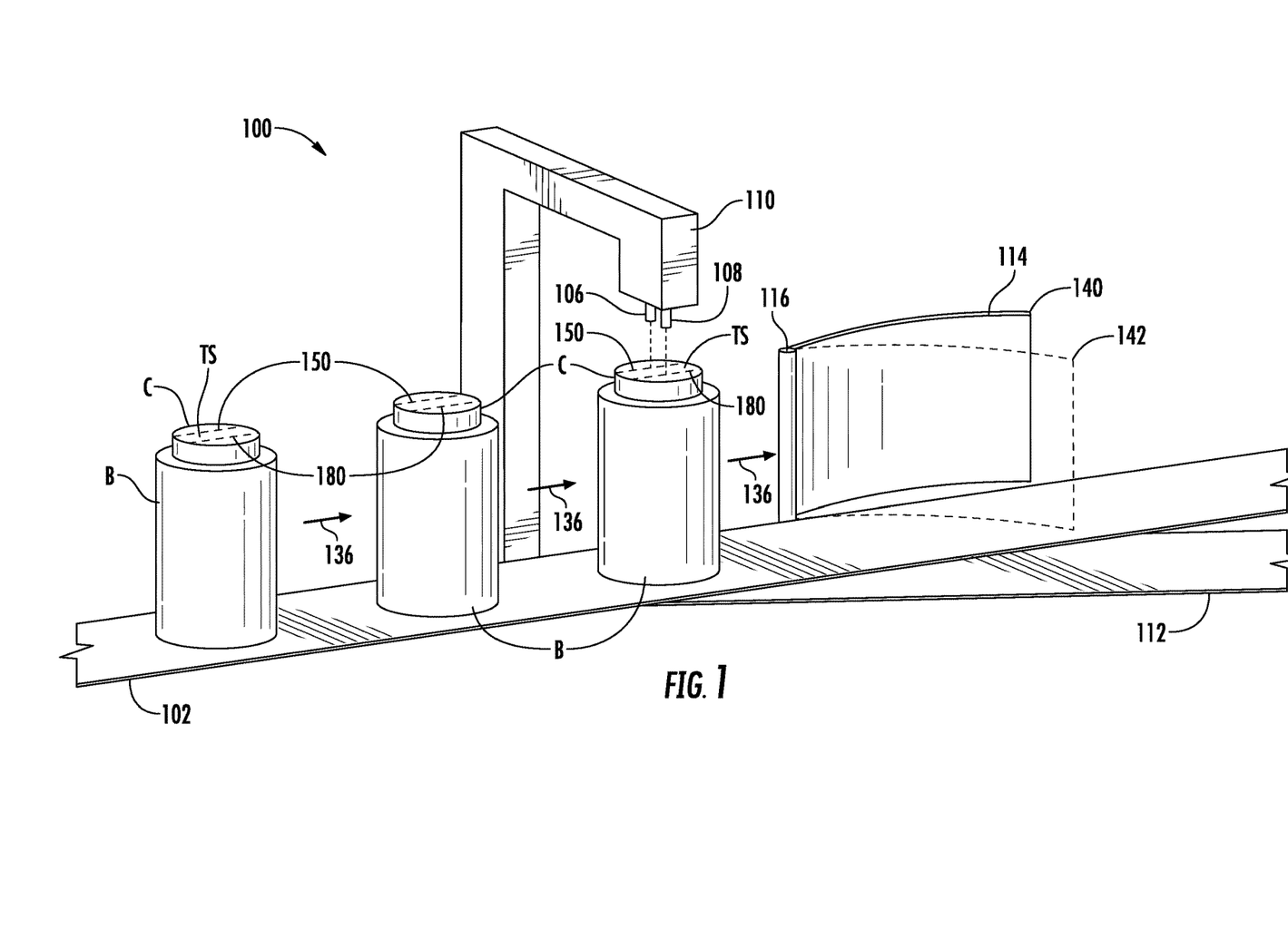
FIG. 1 depicts a system for determining whether closures are properly affixed to containers, according to an exemplary embodiment.

Illustrated in FIG. 1 is an exemplary system 100 for determining whether closures have been properly applied to containers, according to an exemplary embodiment. System 100 includes conveyer 102 that moves containers B in direction 136 past laser platform 110. Laser platform 110 includes first detection device 106 and second detection device 108, shown as first laser 106 and second laser 108. It is contemplated herein that first and second detection devices 106, 108 may be any type of device that would detect distances to a closure C, such as a laser-emitting device with a laser receiver (e.g., first and second lasers 106, 108).

First and second lasers 106, 108 periodically emit lasers in a generally downward direction towards conveyer 102, and when present top surface TS of closure C. The emitted laser is reflected back from the surface it strikes and first and second lasers 106, 108 include detectors that receive the reflected light and then calculate the distance to the surface that reflected the light. By these measurements, system 100 can determine whether closure C is properly affixed to containers B.

System 100 may be configured to work with all types of closures and containers. For exemplary purposes only and without limitation, system 100 may be configured to work with metal closures on glass containers where the contents are in a vacuum, and subsequently adjusted to work with plastic closures on plastic containers.

As containers B pass under laser platform 110, first and second lasers 106, 108 measure the distance to closure C. First laser 106 measures the distance to closure C along first path 150, and second laser 108 measures the distance to closure C along second path 180. System 100 then analyzes the measured distances and determines whether closure C is properly affixed to container B. If system 100 determines closure C is properly affixed to container B, then redirector component 114 remains in position 140, thus allowing container B to continue traveling along conveyer 102. If system 100 determines closure C is not properly affixed to container B, then redirector component 114 pivots to position 142, redirecting container B to conveyer 112 to a collection of rejected containers B. Rejected containers B may be discarded, manually examined, and/or closure C may be removed and reattached.

Figure 2:
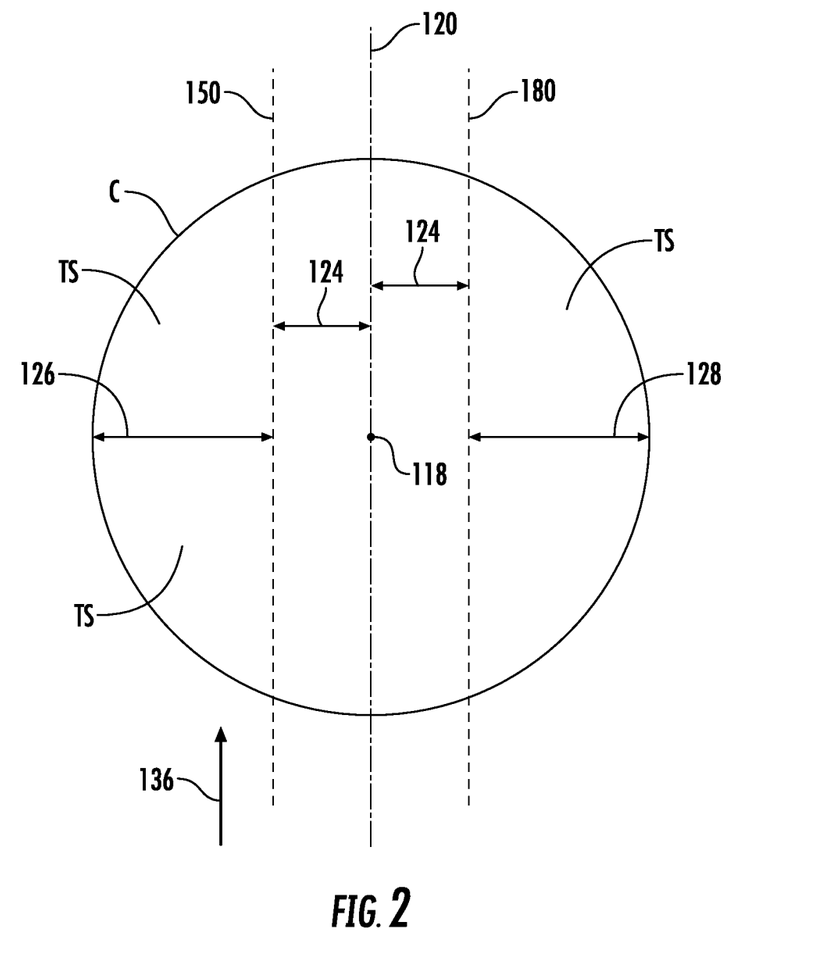
FIG. 2 depicts a top surface of a closure being analyzed by the system of FIG. 1, according to an exemplary embodiment.

Turning now to FIG. 2, illustrated therein is a top surface TS of closure C that is passing under first and second lasers 106, 108. Container B, and thus also closure C, are moving in direction 136 along conveyer 102. As closure C passes under first and second lasers 106, 108, they measure distances along first and second paths 150, 180, respectively.

In one exemplary embodiment, first and second paths 150, 180 are equidistant from center line 120, and first and second lasers 106, 108 are first and second peripheral distances 126, 128 from the lateral edge of closure C that is furthest from center point 118 as viewed from the perspective of direction 136. In the exemplary embodiment in FIG. 2, central displacement distances 124 are approximately one-half of lateral displacement distances 126, 128, and thus first and second paths 150, 180 are displaced from center line 120 by approximately one-third of the radius of top surface TS of closure C.

In another embodiment the location of first and second lasers 106, 108 are adjusted to larger or smaller distances 124 from center line 120. In another embodiment, the location of first and second lasers 106, 108 may remain static but their aim may be adjusted such that first and second paths 150, 180 are larger or smaller distances 124 from center line 120. In yet another embodiment, first and second paths 150, 180 are independently adjusted so that each has a different distance from center line 120.

Figure 3:
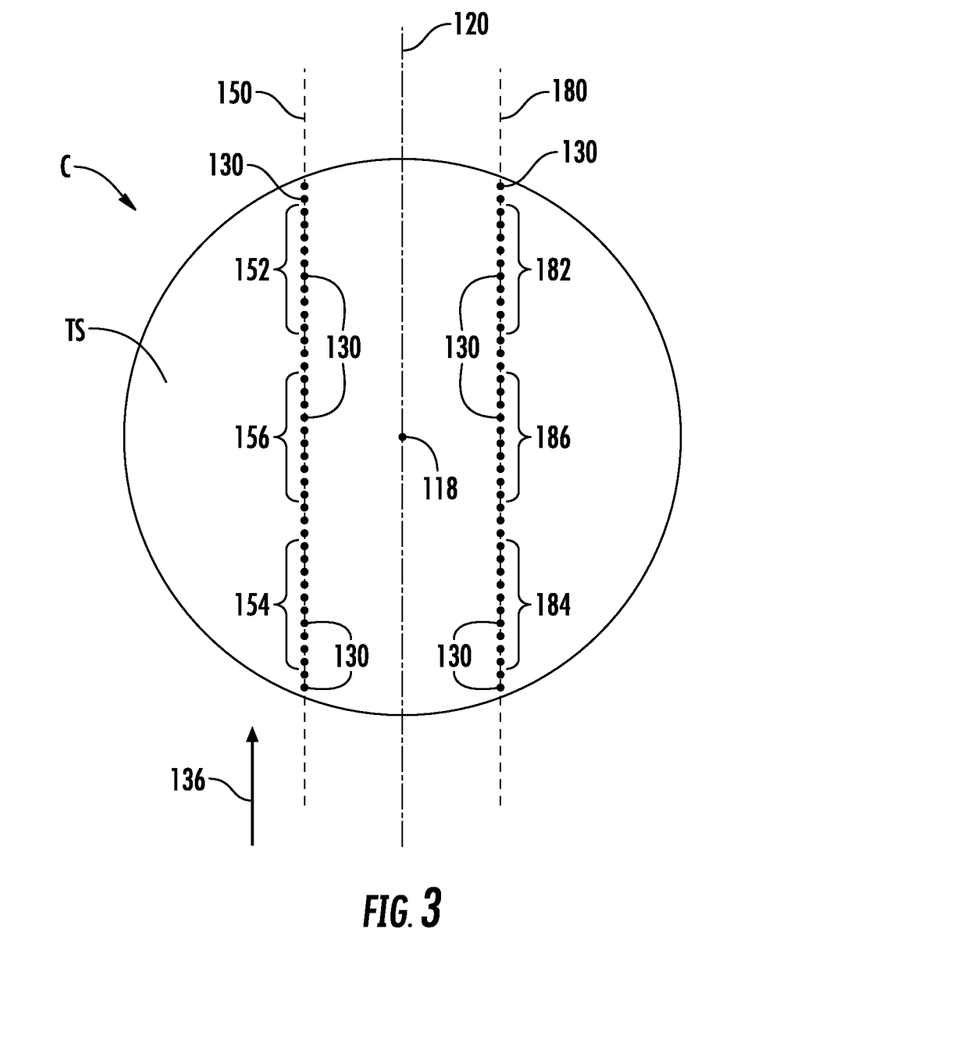
FIG. 3 depicts a top surface of a closure being analyzed by the system of FIG. 1, according to an exemplary embodiment.

Turning to FIG. 3, as top surface TS of closure C passes under laser platform 110, first and second lasers 106, 108 measure distances at various measurement locations 130 along first and second paths 150, 180. In FIG. 3, first and second lasers 106, 108 measure forty location 130 along each of first and second paths 150, 180. It is contemplated herein that any number of measurements per detection device 106, 108 may be used, such as a certain number of measurements per closure (e.g., 30, 40, 50, 100) or a certain number of measurements per distance (e.g., one measurement every millimeter, one measurement every 0.25 millimeter, etc.).

As will be discussed later in greater detail, for various methods of analysis measurements 130 on first path 150 are separated into different sets of measurements 130. Generating these subsets of measurements 130 enables analysis of whether closure C is properly affixed to container B.

In one exemplary situation depicted in FIG. 3, first leading set 152 of measurements 130 is in direction 136 from center point 118 along first path 150. First trailing set 154 of measurements 130 is in the rearward half of top surface TS along first path 150. In one or more embodiments first leading set 152 and first trailing set 154 are symmetrical along first path 150 with respect to the center of first path 150, although other non-symmetrical groupings of first leading set 152 and first trailing set 154 are contemplated.

Second leading set 182 of measurements 130 is in direction 136 from center point 118 along second path 180. Second trailing set 184 of measurements 130 are opposite first leading set 182 along second path 180. In one or more embodiments, second leading set 182 and second trailing set 184 are symmetrical along second path 180 with respect to its center, although other non-symmetrical groupings of second leading set 182 and second trailing set 184 are contemplated.

One system of analyzing whether closure C is properly affixed is based on whether averages of one or more of first leading set 152, first trailing set 154, second leading set 182 and second trailing set 184 are below a threshold. For example, averages are calculated for each of first leading set 152, first trailing set 154, second leading set 182 and second trailing set 184. The averages are then compared to a threshold. If all of the averages are below a threshold, then closure C is determined to be properly affixed. If at least one of the averages is above a threshold, then closure C is determined to be improperly affixed, and should be discarded (e.g., by redirecting component 114 to second position 142 so that container B with improperly affixed closure C is redirected to secondary conveyer 112).

In another method, closure C is determined to be properly affixed if: Highest Average−Lowest Average<Threshold. For example, the highest and lowest of at least two averages are selected. The lowest average is subtracted from the highest average to calculate a difference. Because the first leading set 152, first trailing set 154, second leading set 182 and second trailing set 184 are symmetrically arranged on closure C with respect to center point 118, the difference between the measurements for each set should be very similar, if anything. Therefore, if the difference between the highest and lowest averages is less than a threshold, closure C is determined to be properly affixed, and if the difference between the highest and lowest averages is greater than a threshold, closure C is determined to not be properly affixed.

In another method, closure C is determined to be properly affixed if Middle Average−(Leading Average+Trailing Average)/2>Threshold, or Middle Average−(Leading Average+Trailing Average)/2<Threshold, depending on the nominal characteristics of the closure, for one or both of first and second paths 150, 180. For example, first middle set 156 and second middle set 186 are also identified and an average for each is calculated. For at least one of the paths 150 or 180, the average of the middle set 156 or 186 is compared to the average of both averages of the leading set 152 and the trailing set 154, or the average of both averages of the leading set 182 and the trailing set 184, and a difference is calculated. The difference is then compared to a threshold. For certain types of closure C, where the difference is greater than the threshold, then the closure C is determined to not be properly affixed. For other types of closure C, where the difference is less than the threshold, then the closure C is determined to not be properly affixed.

In yet another method, closure C is determined to be properly affixed if Middle Average−Leading Average<Threshold and Middle Average−Trailing Average<Threshold, for one or both of first and second paths 150, 180. For example, first middle set 156 and second middle set 186 are also identified and an average for each is calculated. For at least one of paths 150 or 180, the average of the middle set 156 or 186 is compared to the average of the leading set 152 or 182, for the same path, and a first difference is calculated. Then the average of the middle set 156 or 186 is compared to the average of the trailing set 154 or 184 and a second difference is calculated. The first and second differences are compared to a threshold and if both differences are below a threshold then the closure C is determined to be properly affixed, whereas if one of the differences is greater than the threshold, then the closure C is determined to not be properly affixed.

Figure 4:
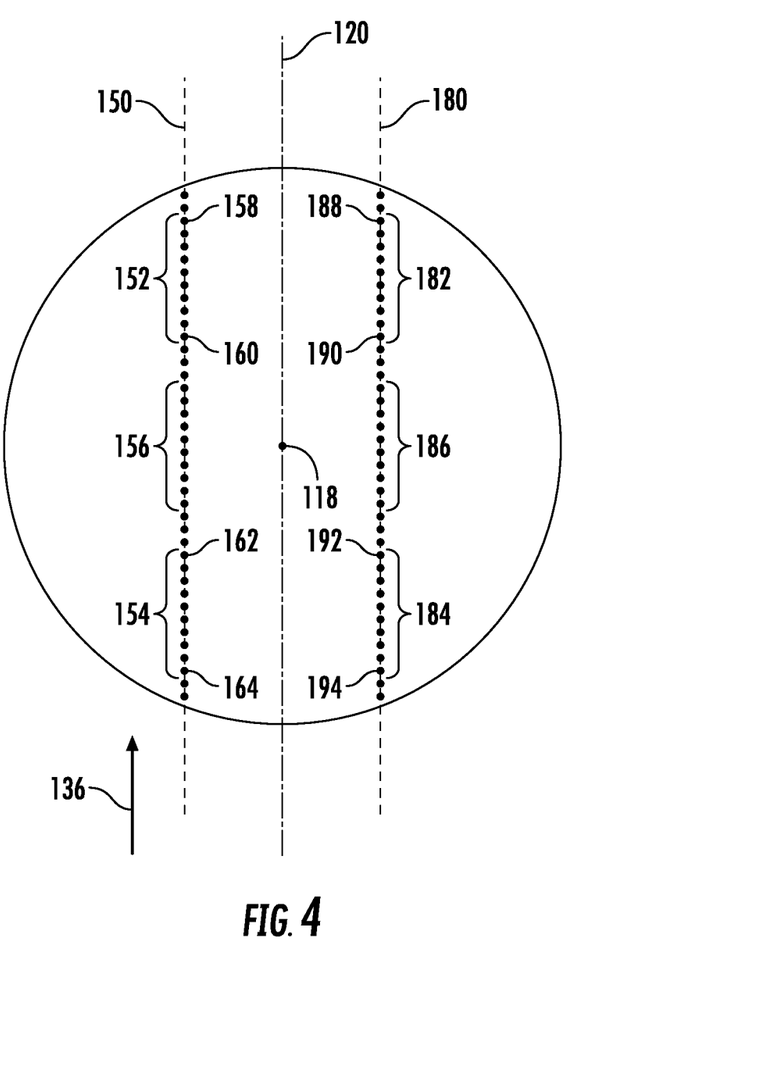
FIG. 4 depicts a top surface of a closure being analyzed by the system of FIG. 1, according to an exemplary embodiment.

Turning to FIG. 4, analysis of closure C may consider front measurement 158 and back measurement 160 of first leading set 152. Analysis of closure C may also consider front measurement 162 and back measurement 164 of first trailing set 154, front measurement 188 and back measurement 190 of second leading set 182, and/or front measurement 192 and back measurement 194 of second trailing set 184.

For closure C to be properly affixed, leading sets 152, 182 should have a symmetrical slope moving compared to trailing sets 154, 184. For example, if first leading set 152 has an upward slope towards the center of closure C, then first trailing set 154 should have a downward slope of an equal or near equal magnitude, or closure C is determined to not be properly affixed. If second leading set 182 has an upward slope moving towards the center of closure C, then second trailing set 184 should have a downward slope of an equal or near equal magnitude, or closure C is determined to not be properly affixed. Slopes of the sets may be calculated by subtracting measurement 130 from the front of the set minus measurement 130 from the back of the set. For example, turning to FIG. 4, measurement 158 is the front measurement 130 of first leading set 152 and measurement 160 is the back measurement 130 of first leading set 152. Measurement 162 is the front measurement 130 of first trailing set 154 and measurement 164 is the back measurement 130 of first trailing set 154. For second path 180, measurement 188 is the front measurement 130 of second leading set 182 and measurement 190 is the back measurement 130 of second leading set 182, and measurement 192 is the front measurement 130 of second trailing set 184 and measurement 194 is the back measurement 130 of second trailing set 184. The back measurement 130 is subtracted from the front measurement 130 to calculate a slope for the respective set.

Figure 5:
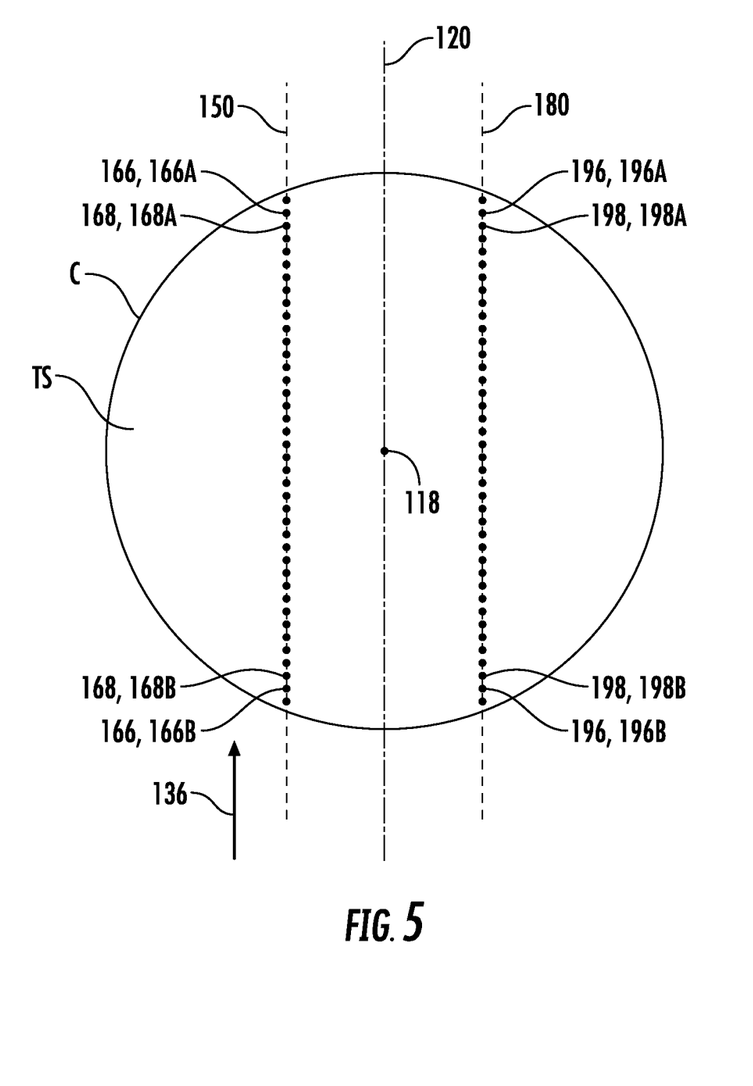
FIG. 5 depicts a top surface of a closure being analyzed by the system of FIG. 1, according to an exemplary embodiment.

Turning to FIG. 5, analysis of closure C may be focused on a presumed symmetry of closure C when properly affixed. Analysis of closure C considers first pair of measurements 166 on first path 150. First pair 166 of measurements 130 on first path 150 includes front element 166A and back element 166B. Second pair 168 of measurements 130 includes front element 168A and back element 168B.

To analyze whether closure C is properly affixed, a first difference is calculated for first pair 166 between measurement 166A and measurement 166B, and second difference is calculated for second pair 168 between measurement 168A and measurement 168B. This calculation of differences continues for measurements 130 of first path 150 towards the center of first path 150. Then the differences are summed together. If the sum of differences on first path 150 is less than a threshold, closure C is determined to be properly affixed, and if the sum of differences on first path 180 is greater than a threshold, closure C is determined to not be properly affixed. The same calculations are performed for second path 180.

It is contemplated that any number of pairs on first path 150 may be analyzed to determine if closure C is properly affixed. For example, five sets of pairs may be selected from first path 150 (e.g., second measurement 130 through sixth measurement from the perimeter of top surface TS of closure C), or 19 pairs may be selected (e.g., all but the outer measurements 130), or any number of pairs (e.g., 5, 10, 15, 20) between multiple paths.

In this example both front and back element 166A, 166B are not the measurement 130 closest to the periphery of top surface TS but are instead the second-closest measurement 130 to the periphery of top surface TS. The motivation for this selection of the second-closest measurement is that occasionally the closest measurement to the periphery is not a reliable measurement 130 because the edge of closure C interferes with the accuracy of that measurement 130. In other embodiments first pair 166 of measurements 130 used for the analysis are the closest measurements 130 to periphery of top surface TS. Similarly with respect to second path 180, first pair 196 of measurements 130 includes front element 196A and back element 196B. Second pair 198 of measurements 130 includes front element 198A and back element 198B.

Figure 6:
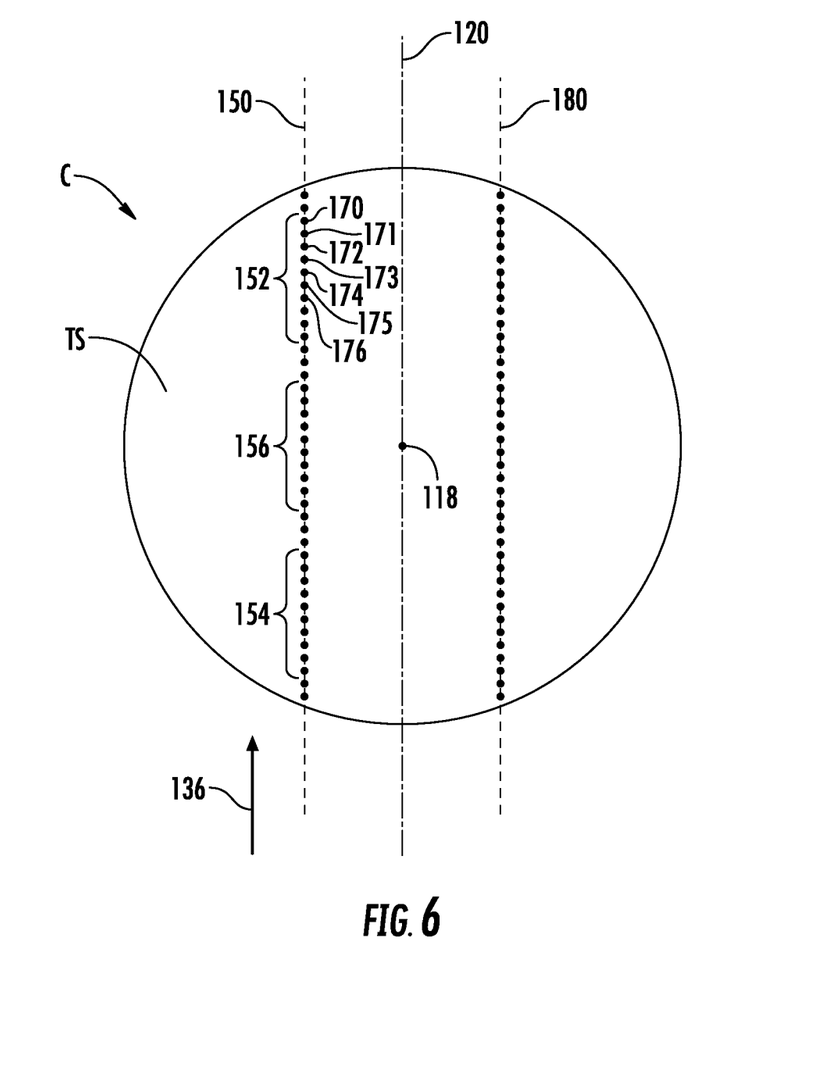
FIG. 6 depicts a top surface of a closure being analyzed by the system of FIG. 1, according to an exemplary embodiment.

Turning to FIG. 6, the delta between successive measurements 130 in different sets 152, 154, 156 may be summed and compared as follows:

$$\sum_{n=2}^{w} (x_n - x_{(n-1)}) \quad \text{Eq. 1}$$

In Equation 1, $x_n$ represents a measurement 130 at a given location n, $x_{(n-1)}$ represents a measurement 130 at a successive neighboring location, n represents the sample number and w represents the number of samples in a set. For illustrative purposes only, an application of this equation will be explained with reference to FIG. 6.

In first leading set 152 on first path 150, the first measurement 170 in FIG. 6 is measurement $x_1$ ("x sub one") in Equation 1 and is at the leading end of first leading set 152 as defined by direction of travel 136. Second measurement 171 in FIG. 6 is measurement $x_2$ ("x sub two") in Equation 1, third measurement 172 in FIG. 6 is measurement $x_3$ ("x sub three") in Equation 1, fourth measurement 173 in FIG. 6 is measurement $x_4$ ("x sub five") in Equation 1, fifth measurement 174 in FIG. 6 is measurement $x_5$ in Equation 1, sixth measurement 175 in FIG. 6 is measurement $x_6$ in Equation 1 and seventh measurement 176 in FIG. 6 is measurement $x_7$ in Equation 1. The analysis of these measurements 130 using Equation 1 would start by calculating $x_2-x_1$, and summing with subsequent deltas. Individual measurements 130 for second leading set 182 can be similarly compared. Individual measurements 130 can also be similarly compared for each of first trailing set 154 and second trailing set 184.

When analyzing trailing sets 154, 184, the summation progression indicated in Equation 1 can be symmetrically applied to account for a negative slope as compared to leading sets 152, 182. To put this another way, when analyzing first trailing set 154, first measurement 130 in FIG. 1, which is $x_1$ in Equation 1, is closest to the trailing edge of top surface TS as defined by direction of travel 136. Continuing with this example, second measurement 130 in FIG. 1, which is $x_2$ in Equation 1, is second-closest to the trailing edge of top surface TS as defined by direction of travel 136. Thus, it will be understood that analysis of each of first leading edge 152 and first trailing edge 154 progresses from the periphery of top surface TS towards the center. In this way, the sign of the resultant summation (e.g., is the result of the summation positive or negative) for each of first leading set 152 and first trailing set 154 is consistent when closure C is properly affixed to container B.

Figure 7:
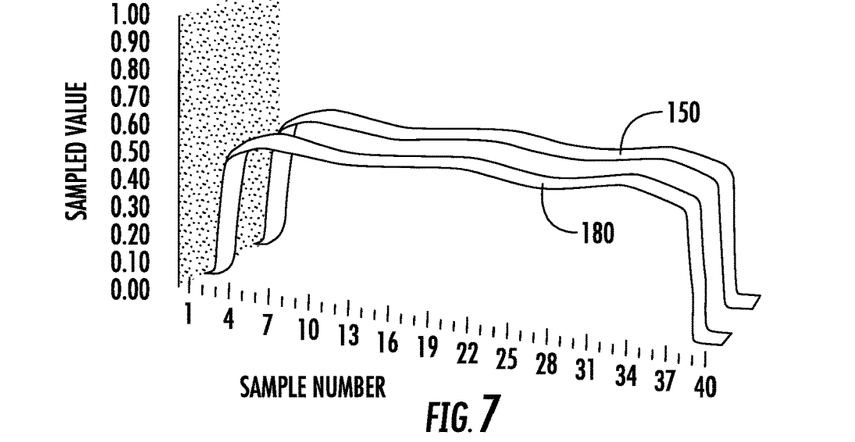
FIG. 7 depicts two series of measurements, by two lasers, of a closure that has been properly affixed to a container, according to an embodiment.
Figure 8:
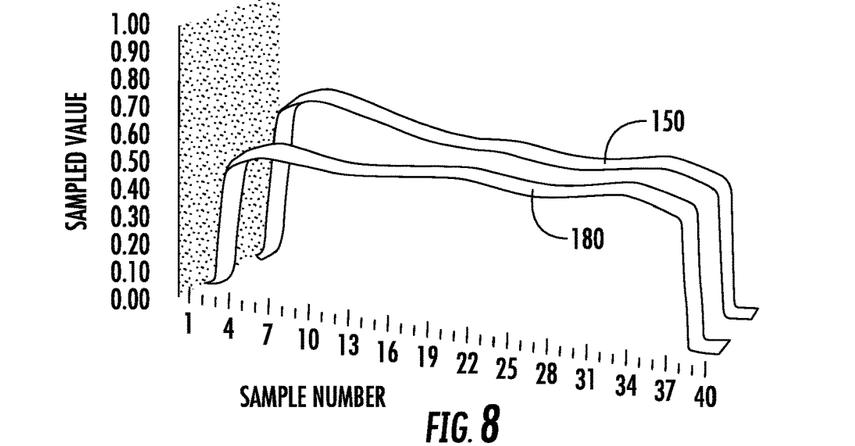
FIG. 8 depicts two series of measurements, by two lasers, of a closure that has not been properly affixed to a container, according to an embodiment.
Figure 9:
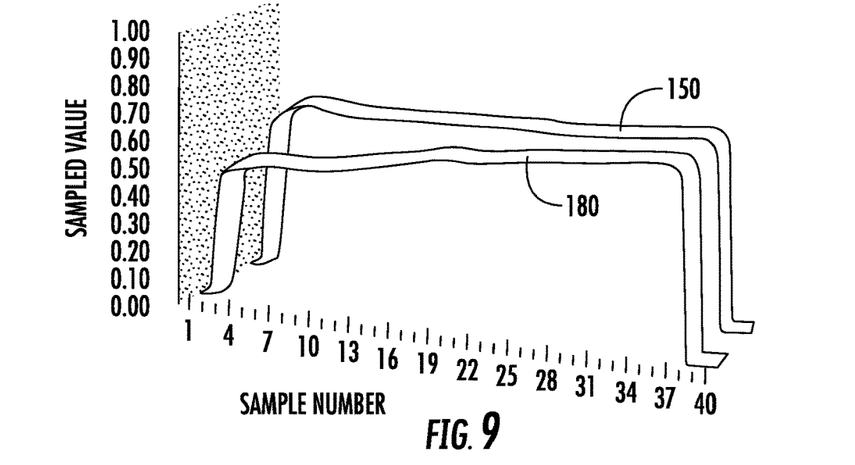
FIG. 9 depicts two series of measurements, by two lasers, of a closure that has not been properly affixed to a container, according to an embodiment.

Turning to FIGS. 7-9, exemplary graphical representations of the measurements 130 of each of first and second paths 150, 180 are depicted. For these examples, FIG. 7 represents measurements 130 for closure C that is properly affixed to container B. As will be seen in FIG. 7, first and second paths 150, 180 are symmetrical with respect to each other, they are symmetrical with respect to themselves, and all of the measurements are between a lower threshold (e.g., 0.5) and an upper threshold (e.g., 0.65), each of these facts being indicative of closure C being properly affixed.

FIG. 8 represents a closure C that is not properly affixed, which can be recognized for several reasons. First, there is a lack of symmetry of first path 150 with respect to itself (i.e., samples 1-16 are substantially higher than samples 24-40). Second, there is a lack of symmetry between first path 150 and second path 180 (i.e., samples 1-16 in first path 150 are substantially higher than samples 1-16 of second path 180). Third, first path 150 includes measurements above upper threshold (e.g., 0.65).

FIG. 9 also represents a closure C that is not properly affixed, which can again be recognized for several reasons. First, there is a lack of symmetry of second path 180 with respect to itself (i.e., samples 1-19 are substantially higher than samples 21-40). Second, there is a lack of symmetry between first path 150 and second path 180 (i.e., samples 1-16 in first path 150 are substantially higher than samples 1-16 of second path 180). Third, both first path 150 and second path 180 include measurements above upper threshold (e.g., 0.65).

In the exemplary analysis above in regard to FIGS. 7-9, the Y-axis measurements are indicative of a properly affixed closure C when they are between measurements of 0.5 and 0.65. However, it will be understood that any thresholds may be used, and indeed the thresholds can be arbitrarily selected to correspond to the measurements being detected by system 100.

In one or more embodiments first and second lasers 106, 108 periodically perform measurements without knowing whether container B and closure C are beneath or approaching being beneath laser platform 110. Alternatively, system 100 may include a component to detect the presence of container B beneath laser platform 110.

Figure 10:
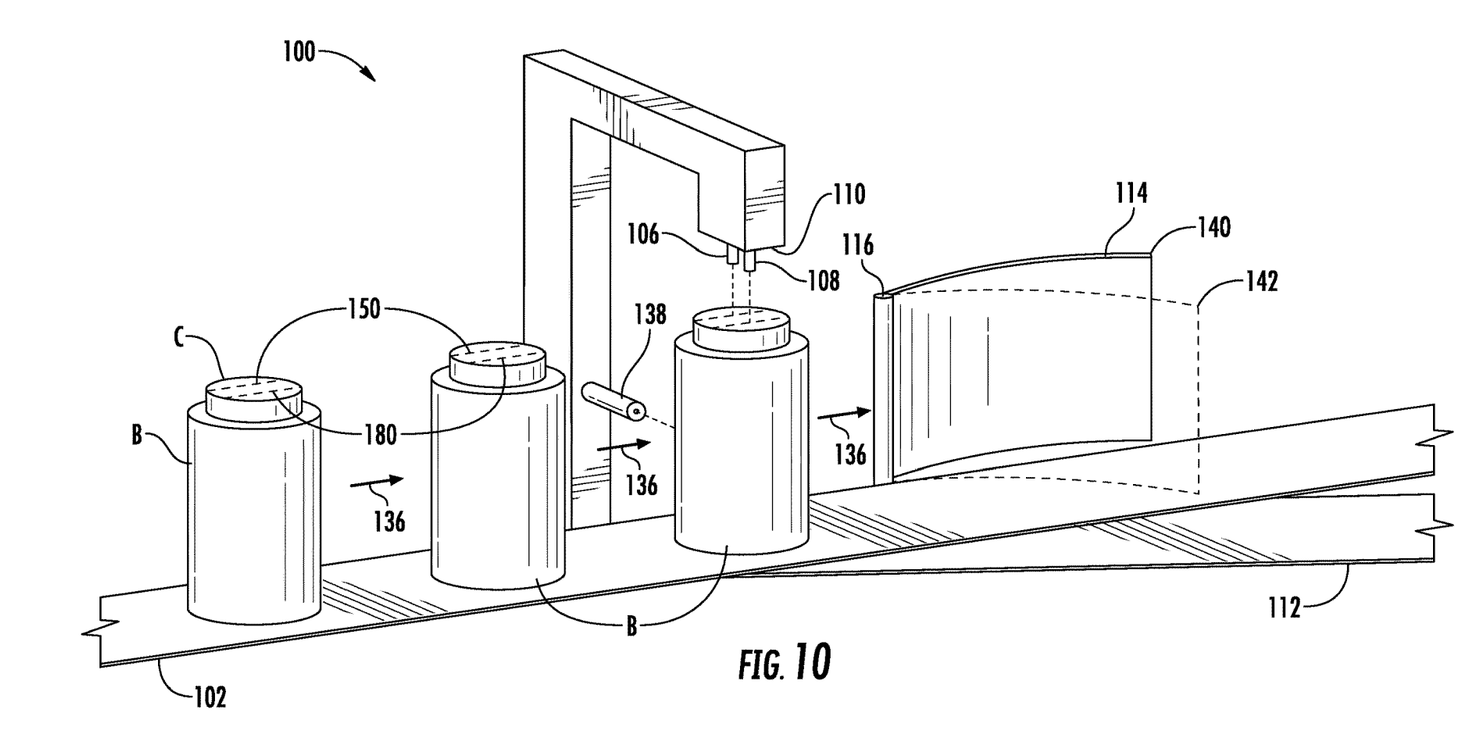
FIG. 10 depicts a system for determining whether closures are properly affixed to containers, according to another embodiment.

Turning now to FIG. 10, system 100 further includes presence detector 138. Presence detector 138 may be a laser, motion detector, or other device that provides system 100 an indication regarding whether container B with closure C is beneath or approaching being beneath laser platform 110. When presence detector 138 indicates that container B is beneath laser platform 110, or approaching being beneath laser platform 110, then first and second lasers 106, 108 begin performing distance measurements 130.

Figure 11:
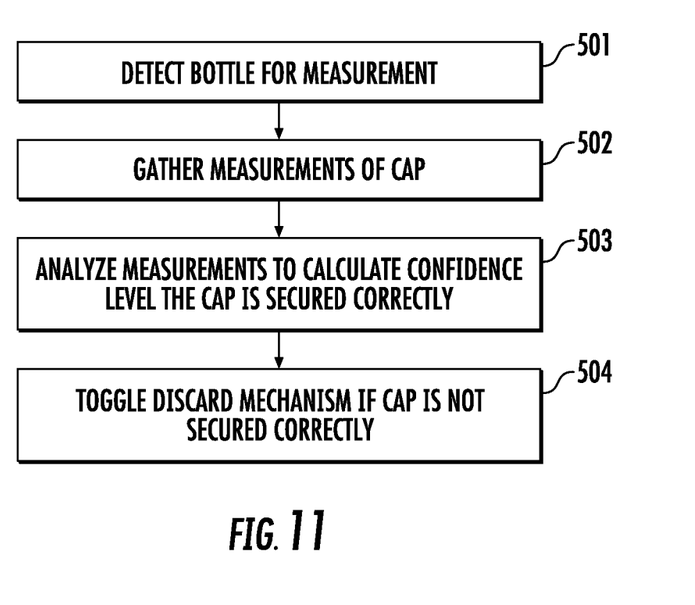
FIG. 11 depicts a series of steps to utilize one or more systems described in this disclosure, according to an exemplary system of use.

Turning to FIG. 11, illustrated therein is an exemplary method of utilizing the concept(s) and system(s) in this disclosure. At step 501, system 100 detects whether closure C is beneath laser platform 110. In one example, system 100 may detect the presence of closure C by virtue of measurements 130 being within a detection range (e.g., between a lower threshold and an upper threshold to detect the presence of closure C). In another example, system 100 may include presence detector 138 to detect, or to aid system 110 in detecting, whether closure C is beneath laser platform 110.

At step 502, system 100 collects measurements 130 of closure C. Measurements 130 include one or more measurements along first path 150 and second path 180.

At step 503, system 100 analyzes measurements 130 to calculate a level of confidence closure C is affixed properly. In one embodiment, system 100 analyzes closure C using one of the above-described methodologies. In another embodiment, system 100 analyzes closure C using more than one of the above-described methodologies.

In still another embodiment, system 100 may be configured to use a given subset of methodologies in response to receiving information about the closure C and/or the container B. For example, if closure C is made of plastic and container B is made of a plastic, system 100 identifies a first set of analysis methodologies to use, whereas if instead closure C is made of metal and container B is made of glass, system 100 identifies a second set of analysis methodologies to use.

At step 504, system 100 discards containers B for whom the chance of their closure C being properly affixed is lower than a threshold. In one embodiment, system 100 discards any containers B for which system 100 determines closure C may be not properly affixed (e.g., system 100 discards containers B for which any data or analysis suggests closure C is not properly affixed).

It should be understood that depending on one or more characteristics of the closure and container, the expected orientation of the closure may be reversed if a characteristic is changed. For example, if a properly affixed closure is expected to be under negative pressure and therefore be inwardly sloped, then the comparisons to the various thresholds will be predicated on that closure orientation. However, if a properly affixed closure is expected to be under positive pressure and therefore be outwardly sloped, then the comparisons to the various thresholds will be the opposite compared to if the expectation was for an inward slope, in one or more of the embodiments described herein.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present disclosure.

While the current application recites particular combinations of features in the claims appended hereto, various embodiments of the disclosure relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A closure monitoring system comprising:
    a conveyer that moves a container with a closure in a direction;
    a first device supported along a direction of travel of the conveyer and configured to generate first distance signals representative of first distances to a top surface of the closure along a first path that traverses the top surface of the closure;
    a second device supported along a direction of travel of the conveyer and configured to generate second distance signals representative of second distances to the top surface of the closure along a second path that traverses the top surface of the closure; and
    a processor coupled to first and second devices to analyze the first and second distance signals to generate a signal in response to the analysis indicating that the closure is improperly affixed to the container;
    wherein the processor is configured to:
    identify a first leading set from the plurality of first distance signals, each distance in the first leading set corresponding to a point on the top surface in a leading half of the container in the direction the container is moving;
    identify a second leading set from the plurality of second distance signals, each distance in the second leading set corresponding to a point on the top surface in a leading half of the container in the direction the container is moving;
    identify a first trailing set from the plurality of first distance signals, each distance in the first trailing set corresponding to a point on the top surface in a trailing half of the container in the direction the container is moving; and
    identify a second trailing set from the plurality of second distance signals, each distance in the second trailing set corresponding to a point on the top surface in a trailing half of the container in the direction the container is moving, wherein the analyzed signal distances are selected from the first leading set, the second leading set, the first trailing set and the second trailing set.

2. The system of claim 1, wherein the processor is further configured to:
    calculate an average distance for each pair of the first leading set, the second leading set, the first trailing set, and the second trailing set;
    determine the closure is properly affixed when each of the averages is less than a first threshold; and
    determine the closure is not properly affixed when at least one of the averages is above the first threshold.

3. The system of claim 1, wherein the processor is further configured to:
    calculate an average distance for each of the first leading set, the second leading set, the first trailing set, and the second trailing set;
    identify a highest average and a lowest average of the averages;
    calculate a difference between the highest average and the lowest average;
    determine the closure is properly affixed when the difference is less than a second threshold; and
    determine the closure is not properly affixed when the difference is above the second threshold.

4. The system of claim 1, wherein each of the sets comprise between 10% and 35% of the path from which they were selected.

5. The system of claim 1, wherein each of the sets comprise between 15% and 30% of the path from which they were selected.

6. The system of claim 1, wherein each of the sets comprise between 17% and 25% of the path from which they were selected.

7. The system of claim 1, wherein the processor is configured to:
- identify a first middle set from the plurality of first distance signals, the first middle set collectively being centered on the first path;
- identify a second middle set of distances from the plurality of second distance signals, the second middle set being centered on the second path;
- calculate a first leading average of the first leading set;
- calculate a first middle average of the first middle set;
- calculate a first trailing average of the first trailing set;
- calculate a second leading average of the second leading set;
- calculate a second middle average of the second middle set;
- calculate a second trailing average of the second trailing set;
- calculate differences between:
  - the first middle average and the average of the first leading average and the first trailing average;
  - the second middle average and the average of the second leading and the second trailing averages;
- determine the closure is properly affixed when each of the differences is less than, or greater than a third threshold, depending on a characteristic of the closure; and
- determine the closure is not properly affixed when at least one of the differences is greater than, or less than the third threshold, depending on the characteristic of the closure.

8. The system of claim 7, wherein the characteristic of the closure comprises whether a properly affixed closure is expected to be inwardly sloped or outwardly sloped.

9. The system of claim 1, wherein the processor is configured to:
- calculate a first leading slope for the first leading set by identifying a distance measurement in the first trailing set that is nearest the leading edge and comparing that to a distance measurement in the first trailing set that is nearest the trailing edge;
- calculate a first trailing slope for the first trailing set by identifying a distance measurement in the first trailing set that is nearest the trailing edge and comparing that to a distance measurement in the first trailing set that is nearest the leading edge;
- calculate a second leading slope for the second leading set by identifying a distance measurement in the second leading set that is nearest the leading edge and comparing that to a distance measurement in the second leading set that is nearest the trailing edge;
- calculate a second trailing slope for the second trailing set by identifying a distance measurement in the second trailing set that is nearest the trailing edge and comparing that to a distance measurement in the second trailing set that is nearest the leading edge;
- analyze the slopes to determine if the closure is properly affixed such that:
  - the closure is determined to be properly affixed when the calculated slopes indicate a center of the closure is elevated above a periphery of the closure; and
  - the closure is determined to be not properly affixed when the calculated slopes indicate a center of the closure is not elevated above a periphery of the closure.

10. A closure monitoring system comprising:
- a conveyer that moves a container with a closure in a direction;
- a first device supported along a direction of travel of the conveyer and configured to generate first distance signals representative of first distances to a top surface of the closure along a first path that traverses the top surface of the closure;
- a second device supported along a direction of travel of the conveyer and configured to generate second distance signals representative of second distances to the top surface of the closure along a second path that traverses the top surface of the closure; and
- a processor coupled to first and second devices to analyze the first and second distance signals to generate a signal in response to the analysis indicating that the closure is improperly affixed to the container;
- wherein the processor is configured to:
- identify a first plurality of pairs of measurements from the first path, the first and second elements of each pair being approximately equal distances from the leading and trailing edges as indicated by the direction of travel, respectively;
- identify a second plurality of pairs of measurements from the second path, the first and second elements of each pair being approximately equal distances from the leading and trailing edges as indicated by the direction of travel, respectively;
- calculate differences between the elements of each pair of the first and second plurality of pairs;
- calculate a sum of the differences;
- determine the closure is properly affixed when the sum is less than a fourth threshold; and
- determine the closure is not properly affixed when the sum is above the fourth threshold.

11. A closure monitoring system comprising:
- a conveyer that moves a container with a closure in a direction;
- a first device supported along a direction of travel of the conveyer and configured to generate first distance signals representative of first distances to a top surface of the closure along a first path that traverses the top surface of the closure;
- a second device supported along a direction of travel of the conveyer and configured to generate second distance signals representative of second distances to the top surface of the closure along a second path that traverses the top surface of the closure; and
- a processor coupled to first and second devices to analyze the first and second distance signals to generate a signal in response to the analysis indicating that the closure is improperly affixed to the container;
- wherein the first and second paths are an equal distance from a centerline diameter that is parallel to both first and second paths.

12. A closure monitoring system comprising:
- a conveyer that moves a container with a closure in a direction;
- a first device supported along a direction of travel of the conveyer and configured to generate first distance signals representative of first distances to a top surface of the closure along a first path that traverses the top surface of the closure;
- a second device supported along a direction of travel of the conveyer and configured to generate second distance signals representative of second distances to the top surface of the closure along a second path that traverses the top surface of the closure; and
- a processor coupled to first and second devices to analyze the first and second distance signals to generate a signal in response to the analysis indicating that the closure is improperly affixed to the container;

wherein the first and second paths being generally parallel to each other.

13. A closure monitoring system comprising:
a conveyer that moves a container with a closure in a direction;
a first device supported along a direction of travel of the conveyer and configured to generate first distance signals representative of first distances to a top surface of the closure along a first path that traverses the top surface of the closure;
a second device supported along a direction of travel of the conveyer and configured to generate second distance signals representative of second distances to the top surface of the closure along a second path that traverses the top surface of the closure; and
a processor coupled to first and second devices to analyze the first and second distance signals to generate a signal in response to the analysis indicating that the closure is improperly affixed to the container;
wherein the distances within a given set are contiguous with each other.

* * * * *